US011069065B2

(12) United States Patent
Mewes et al.

(10) Patent No.: US 11,069,065 B2
(45) Date of Patent: Jul. 20, 2021

(54) VALIDITY OF A REFERENCE SYSTEM

(71) Applicant: Siemens Healthcare GmbH, Erlangen (DE)

(72) Inventors: Philip Mewes, Nuremberg (DE); Gunter Mueller, Heroldsberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 97 days.

(21) Appl. No.: 16/458,318

(22) Filed: Jul. 1, 2019

(65) Prior Publication Data

US 2020/0020101 A1 Jan. 16, 2020

(30) Foreign Application Priority Data

Jul. 10, 2018 (DE) ...................... 10 2018 211 381.5

(51) Int. Cl.
*G06T 7/00* (2017.01)
*G06T 7/30* (2017.01)
*G06T 11/60* (2006.01)

(52) U.S. Cl.
CPC .............. *G06T 7/0016* (2013.01); *G06T 7/30* (2017.01); *G06T 11/60* (2013.01);
(Continued)

(58) Field of Classification Search
CPC .................... G06T 7/0016; G06T 7/30
See application file for complete search history.

(56) References Cited

U.S. PATENT DOCUMENTS

2003/0035584 A1  2/2003 Nicolas et al.
2009/0169116 A1* 7/2009 Iizuka ................ G06K 9/00885
                                                         382/218
(Continued)

FOREIGN PATENT DOCUMENTS

DE       10237099 A1    2/2003
JP       H09166411 A    6/1997
(Continued)

OTHER PUBLICATIONS

Japanese Office Action and English translation thereof dated Jul. 8, 2020.
(Continued)

*Primary Examiner* — Tuan H Nguyen
(74) *Attorney, Agent, or Firm* — Harness, Dickey & Pierce, P.L.C.

(57) ABSTRACT

In an embodiment, a method includes acquiring a first image data set of the patient, via an X-ray apparatus, at a first time point during the operative intervention, the first image data set including the reference structure, the anatomical structure and the reference system between the reference structure and the anatomical structure; acquiring a second image data set of the patient at a second time point, the second image data set including at least the reference structure; registering the second image data set to the first image data set. As a result of the registering of the second image data set to the first image data set, a registered second image data set is determined. Finally, an embodiment of the method includes determining the validity of the reference system by a comparison of the registered second image data set with the first image data set.

20 Claims, 4 Drawing Sheets

(52) U.S. Cl.
CPC ............... *G06T 2207/10116* (2013.01); *G06T 2207/30012* (2013.01); *G06T 2207/30204* (2013.01)

(56) References Cited

U.S. PATENT DOCUMENTS

| | | |
|---|---|---|
| 2009/0196470 A1 | 8/2009 | Carl et al. |
| 2013/0338492 A1 | 12/2013 | Munro et al. |
| 2017/0165008 A1 | 6/2017 | Finley |
| 2018/0160971 A1 | 6/2018 | Giphart et al. |
| 2018/0185113 A1* | 7/2018 | Gregerson ............... G06T 15/08 |

FOREIGN PATENT DOCUMENTS

| | | |
|---|---|---|
| JP | 2009540972 A | 11/2009 |
| WO | WO 2016197249 A1 | 12/2016 |
| WO | WO 2017106357 A1 | 6/2017 |
| WO | WO 2018049196 A1 | 3/2018 |

OTHER PUBLICATIONS

German Office Action dated Oct. 24, 2019.
German Office Action dated Sep. 28, 2020.
Japanese Notice of Allowance and English translation thereof dated Jan. 12, 2021.

\* cited by examiner

VALIDITY OF A REFERENCE SYSTEM

PRIORITY STATEMENT

The present application hereby claims priority under 35 U.S.C. § 119 to German patent application number DE 102018211381.5 filed Jul. 10, 2018, the entire contents of which are hereby incorporated herein by reference.

FIELD

Embodiments of the invention generally relate to a method for a determination of a validity of a reference system between a reference structure and an anatomical structure during an operative intervention on a patient, an associated medical system and an associated computer program product.

BACKGROUND

During an operative intervention on a patient, different units of a medical system are typically put to use. Such units can be, for example, a patient table, an X-ray apparatus, a C-arm system, a camera and/or a medical instrument. These different units of the medical system typically have different coordinate systems that are independent of one another. The mutually independent coordinate systems are preferably placed in relationship by way of at least one transformation rule, so that the units of the medical system avoid collisions and/or can cooperate, for example, for a medical imaging in which the patient table and/or the X-ray apparatus and/or the medical instrument can move relative to one another. The patient typically has a patient coordinate system which can be captured and/or defined, for example, during the medical imaging. Preferably, the patient coordinate system correlates to an image coordinate system of image data sets acquired in the medical imaging.

Typically before and/or during the operative intervention, a registration between the patient coordinate system and a coordinate system of the medical system is carried out. For example, for this purpose, a reference structure is fastened to the patient, in particular to an anatomical structure of the patient. One assumption is typically that the reference structure is and remains firmly and/or rigidly connected to the patient, so that a reference system between the reference structure and the anatomical structure is defined. The reference structure is preferably connected to the patient via a fastening device. The reference structure typically enables a better registration than if merely the anatomical structures are registered. On the basis of the registration between the patient coordinate system which comprises the reference system and the coordinate system of the medical system, the at least one transformation rule is initially defined.

Under certain circumstances, however, the above assumption no longer applies. This is because a connection between the reference structure and the anatomical structure can be released and/or displaced, for example, if a user of the medical system collides with the reference structure during the operative intervention and/or the fastening device becomes detached. In this case, the reference system can lose its validity, whereby a further reference system is defined between the reference structure and the anatomical structure and is also valid. If the reference system is invalid, the at least one transformation rule is also typically no longer valid. Therefore, usually, a renewed time-consuming registration takes place between a further patient coordinate system, which comprises the further reference system in place of the reference system, and the coordinate system of the medical system.

In order to test the above assumption during the operative intervention, a "sanity check" is usually carried out to determine the validity of the reference system, whereby a user of the medical system manually checks as to how far the validity of the reference system still applies. The manual checking typically comprises the medical instrument being placed on an anatomical landmark whereby the medical instrument is detected, for example, via the camera and is simultaneously displayed on a display unit in an overlay to an image data set with the anatomical landmark and whereby the user visually checks whether the medical instrument has an identical position both in overlay relative to the anatomical landmark of the image data set and also in reality. If the position is identical, the at least one transformation rule between the coordinate systems, in particular the patient coordinate system and the coordinate system of the medical system is, in particular still, valid.

The anatomical landmark can be a readily accessible and/or exposed bone with a clearly recognizable feature, for example, a nose and/or a vertebral process of the patient. The manual checking is disadvantageous in that the anatomical landmark must be available for mechanical contact and/or an accuracy of the checking depends on the unambiguously recognizable feature and/or on a granularity of the feature and/or on a subjective visual check by the user. Furthermore, during the manual checking, the optically detected medical instrument must be kept still.

SUMMARY

An embodiment of the invention provides an improved possibility for determining a validity of a reference system.

Advantageous embodiments are disclosed in the claims.

An embodiment is directed to an inventive method for a determination of a validity of a reference system between a reference structure and an anatomical structure during an operative intervention on a patient, the method comprising:

acquiring a first image data set of the patient via an X-ray apparatus at a first time point during the operative intervention, the first image data set comprising the reference structure, the anatomical structure and the reference system between the reference structure and the anatomical structure;

acquiring a second image data set of the patient at a second time point via the X-ray apparatus during the operative intervention, the second image data set comprising at least the reference structure;

registering the second image data set to the first image data set, wherein the reference structure represented in the first image data set and the reference structure represented in the second image data set are entered as input parameters in the registration and wherein as the result of the registration of the second image data set to the first image data set, a registered second image data set is determined, and determining the validity of the reference system by a comparison of the registered second image data set with the first image data set.

An embodiment is directed to an inventive medical system for a determination of a validity of a reference system between a reference structure and an anatomical structure during an operative intervention on a patient, comprising:

an X-ray apparatus configured to acquire a first image data set of the patient at a first time point during the operative intervention, the first image data set including the reference structure, the anatomical structure and the reference system between the reference structure and the anatomical structure, and acquire a second image data set of the patient at a second time point during the operative intervention, wherein the second image data set includes at least the reference structure; and at least one processor, configured to register the second image data set to the first image data set, wherein the reference structure represented in the first image data set and the reference structure represented in the second image data set are entered as input parameters in the registering and wherein, as a result of the registering of the second image data set to the first image data set, a registered second image data set is determined, and determine the validity of the reference system by a comparison of the registered second image data set with the first image data set.

One embodiment provides that the X-ray apparatus has a C-arm system. The C-arm system preferably enables a rapid acquisition of a volumetric image data set.

An embodiment is directed to inventive computer program product which is directly loadable into a memory store of a computer unit and has program code segments in order to carry out an inventive method when the computer program product is executed in the computer unit.

The computer program product can be a computer program or can comprise a computer program. The computer program product has, in particular, the program code segments which form an embodiment of the inventive method steps. By this, an embodiment of the inventive method can be carried out in a defined and repeatable manner and monitoring can be performed by way of a passing on of the inventive method. The computer program product is preferably configured such that the computer unit can carry out an embodiment of the inventive method steps via the computer program product.

The program code segments can be loaded, in particular, into a memory store of the computer unit and are typically carried out via a processor of the computer unit with access to the memory store. If the computer program product, in particular the program code segments, is carried out in the computer unit, typically an embodiment of the inventive embodiments of the method described can be carried out.

The computer program product is, for example, stored on a physical computer-readable medium and/or digitally as a data packet in a computer network. The computer program product can represent the physical, computer-readable medium and/or the data packet in the computer network.

An embodiment of the invention can thus also proceed from the physical computer-readable medium and/or the data packet in the computer network. The physical, computer-readable medium is typically connectable directly to the computer unit, for example in that the physical computer-readable medium is inserted into a DVD drive or into a USB port, whereby the computer unit can access the physical computer-readable medium, in particular readingly. The data packet can preferably be called from the computer network. The computer network can comprise the computer unit or can be indirectly connected via a Wide Area Network (WAN) or a (Wireless) Local Area Network (WLAN or LAN) to the computer unit. For example, the computer program product can be stored digitally on a Cloud server at a storage location of the computer network, and transferred via the WAN via the Internet and/or via the WLAN or LAN to the computer unit, in particular via the calling of a download link which points to the storage location of the computer program product.

BRIEF DESCRIPTION OF THE DRAWINGS

The invention will now be described and explained in greater detail making reference to the example embodiments illustrated in the drawings. In principle, structures and units which remain the same are identified in the following description of the figures with the same reference signs as in the first occurrence of the relevant structure or unit.

In the drawings.

DETAILED DESCRIPTION OF THE EXAMPLE EMBODIMENTS

Figure 1:
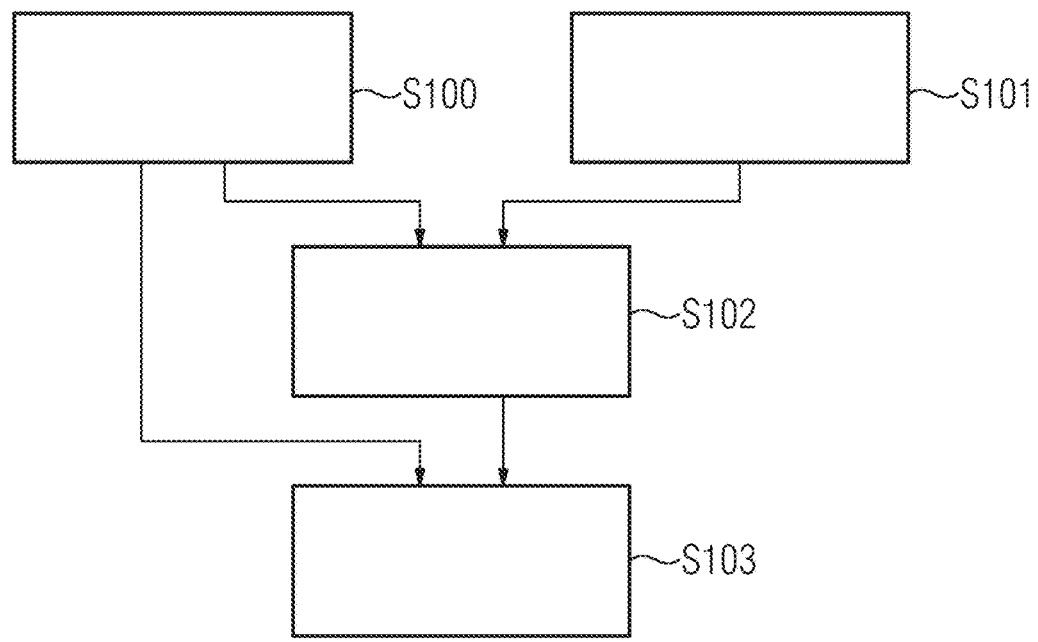
FIG. 1 is a flow diagram of a method for a determination of a validity of a reference system between a reference structure and an anatomical structure during an operative intervention on a patient in a first example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or porcessors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

An embodiment is directed to an inventive method for a determination of a validity of a reference system between a reference structure and an anatomical structure during an operative intervention on a patient, the method comprising:

acquiring a first image data set of the patient via an X-ray apparatus at a first time point during the operative intervention, the first image data set comprising the reference structure, the anatomical structure and the reference system between the reference structure and the anatomical structure;

acquiring a second image data set of the patient at a second time point via the X-ray apparatus during the operative intervention, the second image data set comprising at least the reference structure;

registering the second image data set to the first image data set, wherein the reference structure represented in the first image data set and the reference structure represented in the second image data set are entered as input parameters in the registration and wherein as the result of the registration, a registered second image data set is determined; and determining the validity of the reference system by way of a comparison of the registered second image data set with the first image data set.

Embodiments of the inventive method may have, in particular, one or more of the following advantages:

The comparison of the registered second image data set with the first image data set preferably enables the determination of the validity of the reference system without manual checking via a medical instrument by a user of the medical system. In other words, an alternative "sanity check" according to an embodiment of the method for the determination of the validity of the reference system, in particular, without mechanical contact of an anatomical landmark via the medical instrument, is enabled. Advantageously, a selection of an anatomical landmark which must be accessible to the medical instrument, and/or a holding still of the medical instrument while the user of the medical system carries out a visual check of the validity is accordingly omitted.

A further advantage can be that the validity of the reference system is determined purely image-based and/or quantitatively. Preferably, therefore, smaller displacements of the reference structure can be recognized than if the validity of the reference system is assessed visually.

Advantageously, the validity of the reference system is determined faster than if the manual checking is carried out. Typically, the time saving is associated with a cost advantage.

One embodiment provides that the reference structure comprises at least one image marker, a first fastening device and a holding structure, whereby the at least one image marker is releasably connected via the first fastening device to the holding structure. This embodiment offers the advantage, in particular, that the validity of the reference system can be determined if the at least one image marker becomes detached from the first fastening device.

One embodiment provides that the reference structure has a second fastening device and the holding structure, whereby the holding structure is connected to the patient via the second fastening device and whereby via the connection between the holding structure and the patient, the reference system is initially defined between the reference structure and the anatomical structure. It can advantageously be determined when the connection between the holding structure and the patient becomes released and/or has been displaced, so that typically the reference system is invalid.

One embodiment provides that the reference structure comprises at least one image marker which is X-ray-absorbent and whereby the registration of the second image data set to the first image data set comprises a determination of the reference structure by way of the at least one image marker represented in the first image data set and of the at least one image marker represented in the second image data set. This embodiment is advantageous in that the X-ray-absorbent at least one image marker can have a greater contrast than the anatomical structure in the first image data set and/or the second image data set, by which the registration is typically more precise and/or is simplified.

One embodiment provides that the comparison comprises a determination of a third image data set by way of the first image data set and the registered second image data set. Advantageously, the first image data set and the registered second image data set can be at least partially coincident in a pixel region such that this pixel region in the third image data set is similarly coincident with the first image data set and/or the registered second image data set.

One embodiment provides that the determination of the third image data set comprises a weighting of the first image data set and of the registered second image data set. Advantageously, this embodiment enables a rapid determination of the validity of the reference system. A further advantage can be that dependent upon the structures represented in the first image data set and/or the registered second image data set, a pixel region with the anatomical structure is differently weighted than a pixel region with the reference structure.

One embodiment provides that the determination of the validity captures a visualization of the third image data set on a display unit. Advantageously, a user can view the third image data set on the display unit.

One embodiment provides that the determination of the validity comprises a pixel-related classification of the third image data set into at least two classes dependent upon a deviation from the reference system, whereby pixel-related classification values are determined and whereby the pixel-related classification values are visualized on the display unit as an overlay to the first image data set, to the registered second image data set and/or to the third image data set. This embodiment is advantageous in that the pixel-related classification values represent to the user those pixel regions which have, for example, a slight deviation or a large deviation from the initially performed registration. In other words, the third image data set can be classified such that, dependent upon the pixel-related classification values, the user of the medical system can make an assessment of the extent to which a continuation of the operative intervention is useful without renewed registration.

One embodiment provides that the determination of the validity comprises a calling up of a threshold value, a segmenting of the third image data set, a calculation of segment-related values in the segmented third image data set and a comparison of the segment-related values with the threshold value. Advantageously, this embodiment enables a standardized and therefore repeatable determination of the validity of the reference system. A further advantage of this embodiment can be that the determination of the validity is quantifiable and/or is therefore comparable.

One embodiment provides that the acquisition of the first image data set of the patient via the X-ray apparatus takes place at the first time point and/or the acquisition of the second image data set of the patient takes place at the second time point via the X-ray apparatus during the operative intervention on a spinal column of the patient and whereby the reference structure is connected to the vertebra of the spinal column before the method for the determination of the validity. Advantageously, this embodiment enables a surgical intervention on the spinal column of the patient. A further advantage can be that an investigation duration of the operative intervention on the patient is reduced.

One embodiment provides that, dependent upon the determination of the validity of the reference system, the anatomical structure represented in the second image data set is registered to the anatomical structure represented in the first image data set or in a fourth image data set if the second image data set comprises the reference structure and the anatomical structure. The registration produces, in particular, a further transformation rule. This embodiment offers an advantage, in particular, that the at least one transformation rule is still valid following an extension by the further transformation rule without a renewed time-consuming registration between a further patient coordinate system, which comprises a further reference system in place of the reference system, and the coordinate system of the medical system. In other words, the at least one transformation rule between the coordinate systems is advantageously adapted only according to the difference between the reference system and the further reference system, which usually takes place faster than the renewed time-consuming registration between the further patient coordinate system and the coordinate system of the medical system.

One embodiment provides that a scan region of a fifth image data set is defined dependent upon the reference structure represented in the second image data set and the anatomical structure if the second image data set has the reference structure and the anatomical structure. This embodiment is advantageous in that typically an extent of the scan region correlates to a dose of the X-ray radiation emitted for the fifth image data set.

An embodiment is directed to an inventive medical system comprises a computer unit and the X-ray apparatus.

One embodiment provides that the X-ray apparatus has a C-arm system. The C-arm system preferably enables a rapid acquisition of a volumetric image data set.

An embodiment is directed to inventive computer program product which is directly loadable into a memory store of a computer unit and has program code segments in order to carry out an inventive method when the computer program product is executed in the computer unit.

The computer program product can be a computer program or can comprise a computer program. The computer program product has, in particular, the program code segments which form an embodiment of the inventive method steps. By this, an embodiment of the inventive method can be carried out in a defined and repeatable manner and monitoring can be performed by way of a passing on of the inventive method. The computer program product is preferably configured such that the computer unit can carry out an embodiment of the inventive method steps via the computer program product.

The program code segments can be loaded, in particular, into a memory store of the computer unit and are typically carried out via a processor of the computer unit with access to the memory store. If the computer program product, in particular the program code segments, is carried out in the computer unit, typically an embodiment of the inventive embodiments of the method described can be carried out.

The computer program product is, for example, stored on a physical computer-readable medium and/or digitally as a data packet in a computer network. The computer program product can represent the physical, computer-readable medium and/or the data packet in the computer network.

An embodiment of the invention can thus also proceed from the physical computer-readable medium and/or the data packet in the computer network. The physical, computer-readable medium is typically connectable directly to the computer unit, for example in that the physical computer-readable medium is inserted into a DVD drive or into a USB port, whereby the computer unit can access the physical computer-readable medium, in particular readingly. The data packet can preferably be called from the computer network. The computer network can comprise the computer unit or can be indirectly connected via a Wide Area Network (WAN) or a (Wireless) Local Area Network (WLAN or LAN) to the computer unit. For example, the computer program product can be stored digitally on a Cloud server at a storage location of the computer network, and transferred via the WAN via the Internet and/or via the WLAN or LAN to the computer unit, in particular via the calling of a download link which points to the storage location of the computer program product.

Features, advantages or alternative embodiments mentioned in the description are also transferable similarly to the method and vice versa. In other words, claims for the method can be developed with features of the device and vice versa. In particular, the inventive device can be used in the method.

FIG. 1 shows in a flow diagram a method for a determination of a validity of a reference system B between a reference structure R and an anatomical structure A during an operative intervention on a patient P, comprising the following steps in a first example embodiment:

Method step S100 signifies an acquisition of a first image data set B1 of the patient P via an X-ray apparatus 13 at a first time point during the operative intervention, whereby the first image data set B1 comprises the reference structure R, the anatomical structure A and the reference system B between the reference structure R and the anatomical structure A.

Method step S101 signifies an acquisition of a second image data set B2 of the patient P at a second time point via the X-ray apparatus 13 during the operative intervention, whereby the second image data set B2 comprises at least the reference structure R.

Method step S102 signifies a registration of the second image data set B2 to the first image data set B1, whereby the reference structure R represented in the first image data set B1 and the reference structure R represented in the second image data set B2 are entered as input parameters in the registration and whereby as the result of the registration, a registered second image data set B2' is determined.

Method step S103 signifies a determination of the validity of the reference system B by way of a comparison of the registered second image data set B2' with the first image data set B1.

The determination of the validity of the reference system B, in particular method steps S101 to S103 can take place at least partially and/or completely via a computer unit 10 of a medical system 11. The determination of the validity can take place semi-automatically and/or completely automatically. The determination of the validity can comprise a provision of an output value dependent upon the validity of the reference system B, whereby the output value indicates the validity.

The reference system B between the reference structure R and the anatomical structure A typically defines a relation between the reference structure R and the anatomical structure A. The reference system B depends, in particular, on a positioning of the reference structure R relative to the anatomical structure A. The positioning denotes, in particular, a position and/or an orientation of the reference structure R and/or of the anatomical structure A. The reference system B is typically valid for as long as the positioning of the reference structure R relative to the anatomical structure A remains rigid and/or firm. The reference system B can become invalid if the positioning of the reference structure R changes relative to the anatomical structure A. In principle, it is conceivable that the change of the positioning is quantified in a deviation value and the validity is defined dependent upon the deviation value. For example, a threshold value can be defined, up to which the reference system B remains valid despite the change of the positioning. The reference system B can be changed, for example, by way of force application to the reference structure R and/or to the anatomical structure A. The force application can be based, for example, on gravity and/or a contact with a user of the medical system 11. The reference system B denotes, in particular, a state of the anatomical structure A and of the reference structure B. Due to the change in the positioning, a further reference system B' can be defined.

The anatomical structure A comprises at least one anatomical landmark, in particular bone and/or cartilage structures, of the patient P. The at least one anatomical landmark can comprise a nose, an organ, a bone, a vertebra, a bony process and/or a vertebral process of the patient P.

The reference structure R is typically an artificial structure. In other words, the reference structure R is not a natural component of the patient P. The reference structure R can comprise solid and/or fluid materials. The reference structure R is typically rigid. In other words, the reference structure R is, in particular, non-elastic. The reference structure can be attached to the patient P and/or released from the patient P, for example, before, during and/or after the operative intervention.

The operative intervention comprises, in particular, a surgical intervention, for example, an invasive and/or a minimally invasive intervention. During the operative intervention means that typically the patient P is positioned for the operative intervention on a patient table 12 and/or is anesthetized. The determination of the validity typically denotes a non-invasive procedure. The operative intervention can comprise, in particular, an angiography, a heart operation and/or an intervention on a spinal column of the patient P.

The acquisition of the first image data set B1 typically comprises a provision of the first image data set B1 for a further processing, in particular for the registration according to method step S102. Before the preparation of the first image data set B1, the first image data set B1 is typically acquired via the X-ray apparatus 13. For this purpose, the X-ray apparatus 13 can comprise an X-ray tube and an X-ray detector, whereby the X-ray detector is configured, in particular, for a detection of the X-rays emitted from the X-ray tube. After the detection of the emitted X-rays, for example, via the computer unit 10, the first image data set B1 of the patient P can be reconstructed. It is, in principle, conceivable that before the preparation, the first image data set B1 is transferred to a radiological information system and/or a PACS image archiving system. The acquisition of the first image data set B1 can comprise a calling of the first image data set B1 from the radiological information system and/or the PACS image archiving system. The first image data set B1 can exist, in particular, in a DICOM image format. The first image data set B1 typically has at least one two-dimensional image. It is, in principle, conceivable that the first image data set B1 is a volumetric image data set. The volumetric image data set can have, for example, a stack of two-dimensional images and/or can have been reconstructed from at least two two-dimensional images which are not parallel to one another.

Since the acquisition of the first image data set B1 and the acquisition of the second image data set B2 are substantially identical to one another, for reasons of clarity, with regard to the acquisition of the second image data set B2, reference is made to the previous description of the acquisition of the first image data set B1.

Usually, the first time point is before the second time point. In other words, usually, method step S100 takes place before method step S101. The first time point can be, for example, before an invasive intervention in the patient P and the second time point can be after the invasive intervention. In principle, however, an inverted sequence is also conceivable.

The first image data Set B1 typically has a first scan region and the second image data set typically has a second scan region, whereby preferably the first scan region and the second scan region are coincident. In other words, the same coordinates of the medical system 11 are covered by the first scan region and the second scan region. In principle, it is conceivable that the first scan region and the second scan region partially overlap, whereby in this case, the overlapping intersection set typically comprises the reference structure R.

Since the first image data set B1 comprises the reference structure R, the anatomical structure A and the reference system B between the reference structure R and the anatomical structure A, the reference system B can initially be defined. The second image data set B2 can have the anatomical structure A in addition to the reference structure R. The first image data set B1 and/or the second image date set B2 can comprise further structures in addition to the anatomical structure A and/or the reference structure R. This comprising can mean a representation of the anatomical structure A and/or the reference structure R in the first image data set B1 and/or the second image data set B2. In other words, pixel values of the first image data set B1 and/or of the second image data set B2 typically mirror the anatomical structure A and/or the reference structure R.

The entry of the reference structure R represented in the first image data set B1 and the reference structure R represented in the second image data set B2 as input parameters can comprise a weighting and/or segmentation of the first image data set B1 and/or of the second image data set B2 such that the reference structure R forms a starting point for the registration. In other words, the first image data set B1 and the second image data set B2 are preferably registered such that the reference structure R represented in the first image data set B1 and the reference structure R represented in the registered second image data set B2 are coincident. The weighting and/or segmentation can take place by way of an image recognition algorithm, for example, in the computer unit 10. The result of the registration can comprise an additional transformation rule which can be applied to the second image data set B2 such that the registered second image data set B2' is determined. The registration typically comprises a rigid registration. The rigid registration provides, in particular, a translational and/or rotational transformation rule. The registration can involve a segmentation and/or filtration of the first image data set B1 and/or the second image data set B2. For example, it is conceivable that the additional translational and/or rotational transformation rule is determined by way of a segmented first image data set and/or a segmented second image data set and is applied to the second image data set B2. In principle, it is conceivable that, rather than registering the second image data set B2 to the first image data set B1, the first image data set B1 is registered to the second image data set B2.

The comparison of the registered second image data set B2' with the first image data set B1 can take place semi-automatically and/or completely automatically. In the latter case, this means that the validity of the reference system B is determined without an interaction with the user. The comparison can take place such that the first image data set B1 and the registered second image data set B2' are placed in relation on a pixel basis, whereby changes in the pixel values can indicate that the reference system B is no longer valid. The comparison takes place, proceeding from the reference structure R, in particular, in that only those pixel regions outside the reference structure R are compared with one another, since preferably the reference structure R represented in the first image data set B1 and the reference structure R represented in the registered second image data set B2' lie over one another on a pixel basis. In other words, the positioning of the anatomical structure A is preferably compared in the first image data set B1 with the positioning of the anatomical structure A in the second image data set B2. In principle, it is conceivable that only the anatomical structure A represented in the first image data set B1 is compared with the anatomical structure A represented in the registered second image data set B2'. Usually, the reference system B is valid for as long as the first image data set B1 and the second image data set B2 are coincident. Otherwise in this case, there are no changes in the pixel values which indicate a displacement of the reference structure R between the first time point and the second time point. The validity of the reference system B denotes, in particular, to what extent the positioning of the reference structure R relative to the anatomical structure A changes between the first time point and the second time point.

Figure 2:
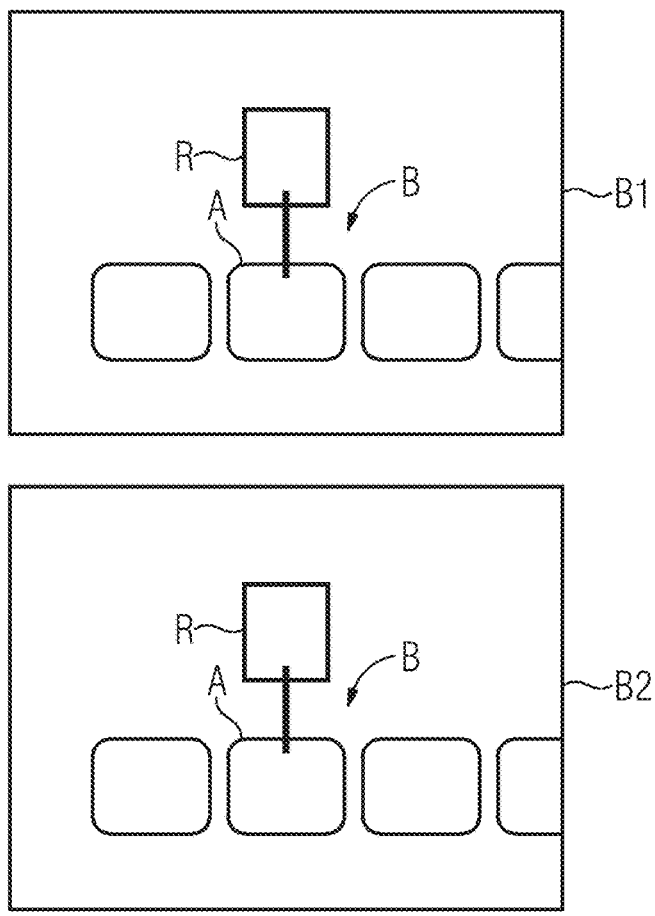
FIG. 2 is a representation of the method for the determination of the validity in a second example embodiment.

FIG. 2 shows the method for the determination of the validity in a second example embodiment.

In FIG. 2, the first image data set B1 and the second image data set B2 are shown one over the other and each include the anatomical structure A and the reference structure B.

FIG. 2 shows the example embodiment whereby the acquisition of the first image data set B1 of the patient P via the X-ray apparatus 13 takes place at the first time point and/or the acquisition of the second image data set B2 of the patient P takes place at the second time point via the X-ray apparatus 13 during the operative intervention on a spinal column of the patient P and whereby the reference structure R is connected to a vertebra of the spinal column before the method for the determination of the validity. The anatomical structure A is, in particular, the vertebra of the spinal column of the patient P.

The reference system B is unambiguously defined in this example embodiment, since the reference structure R is rigidly and/or firmly connected to the patient P, in particular to the spinal column.

The reference structure R comprises at least one image marker, a first fastening device and a holding structure, whereby the at least one image marker is releasably connected via the first fastening device to the holding structure. The first fastening device can be a spherical receiving device for the at least one image marker. In this case, for example, the at least one image marker can be exchanged and/or cleaned before, during and/or after the operative intervention. In principle, it is conceivable that the at least one image marker is a fixed component of the holding structure and/or is not releasably connected.

The reference structure R has a second fastening device and the holding structure, whereby the holding structure is connected to the patient P via the second fastening device and whereby by way of the connection between the holding structure and the patient P, the reference system B is initially defined between the reference structure R and the anatomical structure A. In this case, in particular before the acquisition of the first image data set B1, the reference structure R is invasively connected to the patient P, in particular to the anatomical structure A. The holding structure can consist of plastics and/or metal. The second fastening device can comprise a clamp, a screw and/or a nail. The second fastening device is essentially configured such that the holding structure is firmly and/or rigidly connected to the patient P, in particular during the operative intervention. The firm connection means, in particular, that the holding structure preferably cannot become released from the patient P without a tool. The rigid connection means, in particular, that the reference system B of the reference structure R and of the anatomical structure A preferably does not change except as a result of a force application.

The reference structure R comprises the at least one image marker which in this example embodiment is X-ray-absorbent. Preferably, the reference structure R, in particular, the at least one image marker absorbs more X-rays as compared with the anatomical structure A. The at least one image marker can be a hybrid marker which can be detected, for example, optically via a camera and/or via the X-ray apparatus 13. The at least one image marker can be spherical, whereby the sphere is, for example, filled with contrast medium and/or consists of metal. Particularly advantageously, the at least one image marker comprises a plurality of, for example 4 to 6, spheres which are firmly positioned relative to one another.

The registration of the second image data set B2 to the first image data set B1 according to method step S102 comprises a determination of the reference structure R via the at least one image marker represented in the first image data set B1 and of the at least one image marker represented in the second image data set B2. In other words, the transformation rule resulting therefrom is preferably determined such that the at least one image marker represented in the first image data set B1 and the at least one image marker represented in the registered second image data set B2 are coincident.

As illustrated, by way of example, in FIG. 2, the positioning of the reference structure R relative to the anatomical structure A between the first image data set B1 and the second image data set B2 is unchanged. In this case, the reference system B according to method step S103 is valid.

Figure 3:
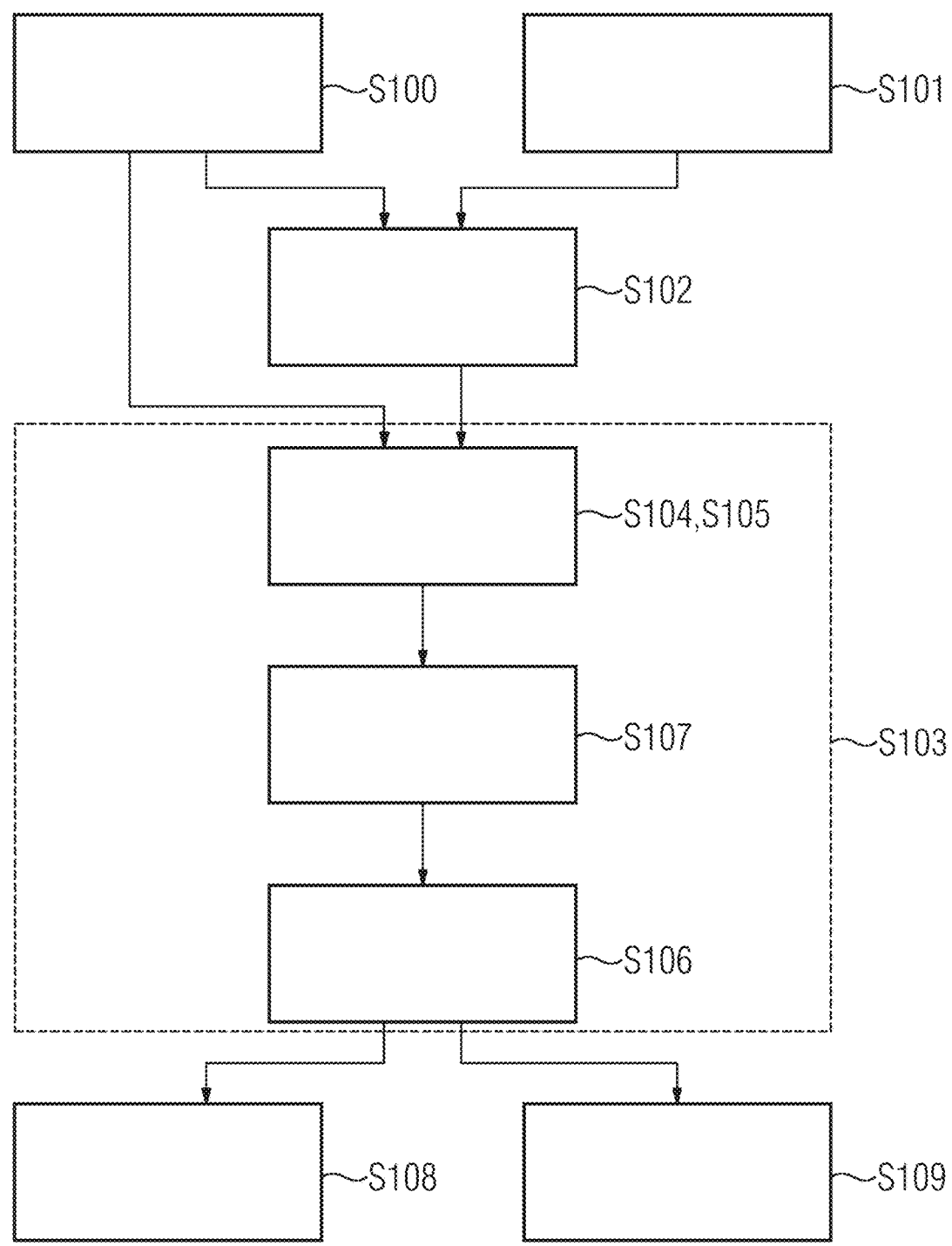
FIG. 3 is a flow diagram of the method for the determination of the validity in a third example embodiment.

FIG. 3 shows in a flow diagram the method for the determination of the validity in a fourth example embodiment.

The method step S104 signifies that the comparison comprises a determination of a third image data set B3 by way of the first image data set B1 and the registered second image data set B2'. The third image data set B3 is typically determined in the computer unit 10. In other words, the third image data set B3 is calculated and not acquired via an imaging apparatus, in particular the X-ray apparatus 13. The determination of the third image data set B3 can comprise a segmentation and/or filtration of the first image data set B1 and of the registered second image data set B2'.

The method step S105 signifies that the determination of the third image data set B3 comprises a weighting of the first image data set B1 and of the registered second image data set B2'. The weighting can comprise an addition, subtraction, multiplication and/or division. The weighting can take place dependent upon an image recognition algorithm which is applied to the first image data set B1 and/or the registered second image data set B2' in order to recognize the reference structure R and/or the anatomical structure A. The image recognition algorithm can recognize, in particular, an anatomical landmark. The image recognition algorithm can be used for the filtration and/or segmentation of the first image data set B1, the second image data set B2, the registered second image data set B2' and/or the third image data set B3.

The method step S107 signifies that the determination of the validity comprises a pixel-related classification of the third image data set B3 into at least two classes dependent upon a deviation from the reference system B, by which pixel-related classification values are determined and whereby the pixel-related classification values are visualized on the display unit 14 as an overlay to the first image data set B1, to the registered second image data set B2' and/or to the third image data set B3. The pixel-related classification can take place pixel by pixel or by groups of pixels. The deviation from the reference system B denotes in particular whether and/or to what extent a displacement of the anatomical structure A between the first image data set B1 and the registered second image data set B2' has taken place. The deviation from the reference system B can be acquired, for example, in pixel coordinates and/or millimeters. One of the two classes can comprise, for example, pixels with a deviation value less than or equal to the threshold value, whereas another of the two classes comprises pixels with a deviation value greater than the threshold value. The threshold value is preferably 5 mm, advantageously 3 mm and particularly preferably 1 mm. The threshold value can lie between 0.1 mm and 5 mm. In this example embodiment, the pixel-related classification values denote in binary form whether a structure represented in this pixel or in this group of pixels has been displaced by not more than 5 mm or more between the first time point and the second time point. In other words, the pixel-related classification values denote regions with slight deviation and regions with a large deviation. Preferably, the user of the medical system 11 can recognize via the overlay in which regions there is a large deviation and in which regions a slight deviation.

The method step S106 signifies that the determination of the validity comprises a visualization of the third image data set B3 on a display unit 14. The determination of the third image data set B3 can include that the first image data set B1 and the registered second image data set B2' are displayed over one another, whereby for example the first image data set B1 and/or the registered second image data set B2' is at least partially transparent. In this case, for example, the user of the medical system 11 can determine the validity of the reference system B.

Alternatively or additionally to the method steps S106 and S107, the determination of the validity can comprise a calling up of a threshold value, a segmenting of the third image data set B3, a calculation of segment-related values in the segmented third image data set B3 and a comparison of the segment-related values with the threshold value. The segmentation of the third image data set B3 can take place by way of the image recognition algorithm in order to recognize the reference structure R and/or the anatomical structure A. The threshold value can be input, for example, by a user of the medical system 11 and/or called from a database. The segment-related values produce, for example, a mean value, a median and/or a value distribution for the segments of the segmented third image data set.

The method step S108 signifies that, dependent upon the determination of the validity of the reference system B, the anatomical structure A represented in the second image data set B2 is registered to the anatomical structure A represented in the first image data set B1 or in a fourth image data set if the second image data set B2 has the reference structure R and the anatomical structure A. In particular, the fourth image data set can be a volumetric image data set which, for example, is acquired via the X-ray apparatus 13 and/or a computed tomography system and/or a magnetic resonance tomography system, typically before the operative intervention.

If the reference system B is valid, typically a transformation rule between the patient coordinate system and the coordinate system of the medical system 11 is valid. Usually, the transformation rule is invalid if the reference system B is invalid. Without a valid transformation rule, there is typically no possibility of placing the patient coordinate system and the coordinate system of the medical system 11 into relationship other than by a renewed registration of both the coordinate systems. This renewed registration is typically time-consuming and/or computation-intensive. The patient coordinate system typically has the reference system B. If the reference system B becomes invalid, the patient coordinate system typically also becomes invalid and a further patient coordinate system becomes valid. The further patient coordinate system typically has the further reference system B'. The further reference system B' can come about in that between the first image data set B1 and the second image data set B2, the reference system B becomes invalid.

Typically, the fourth image data set comprises the patient coordinate system and/or is registered with the patient coordinate system by way of the at least one transformation rule. Preferably, the at least one transformation rule can be extended and/or enhanced by a further transformation rule, whereby the further patient coordinate system and the coordinate system of the medical system 11 can be placed in relationship again. The extension can comprise a multiplication of the at least one transformation rule by the further transformation rule. Typically, the further transformation rule can be determined if the anatomical structure A represented in the second image data set B2 is registered to the anatomical structure A represented in the first image data set B1 or in a fourth image data set.

The method step S109 signifies that a scan region of a fifth image data set is defined dependent upon the reference structure R represented in the second image data set B2 and the anatomical structure A if the second image data set B comprises the reference structure R and the anatomical structure A. Preferably, the fifth image data set comprises the reference structure R and the anatomical structure A, in particular if the scan region is defined accordingly beforehand. The definition of the scan region can take place, for example, on the display unit 14 by the user of the medical system 11 and/or automatically in the computer unit 10.

It is conceivable, in principle, that the method steps S108 and S109 take place in a different sequence, non-parallel.

The method steps S104 to S109 can typically take place independently of one another and thereafter can be carried out either individually or arbitrarily combined.

Figure 4:
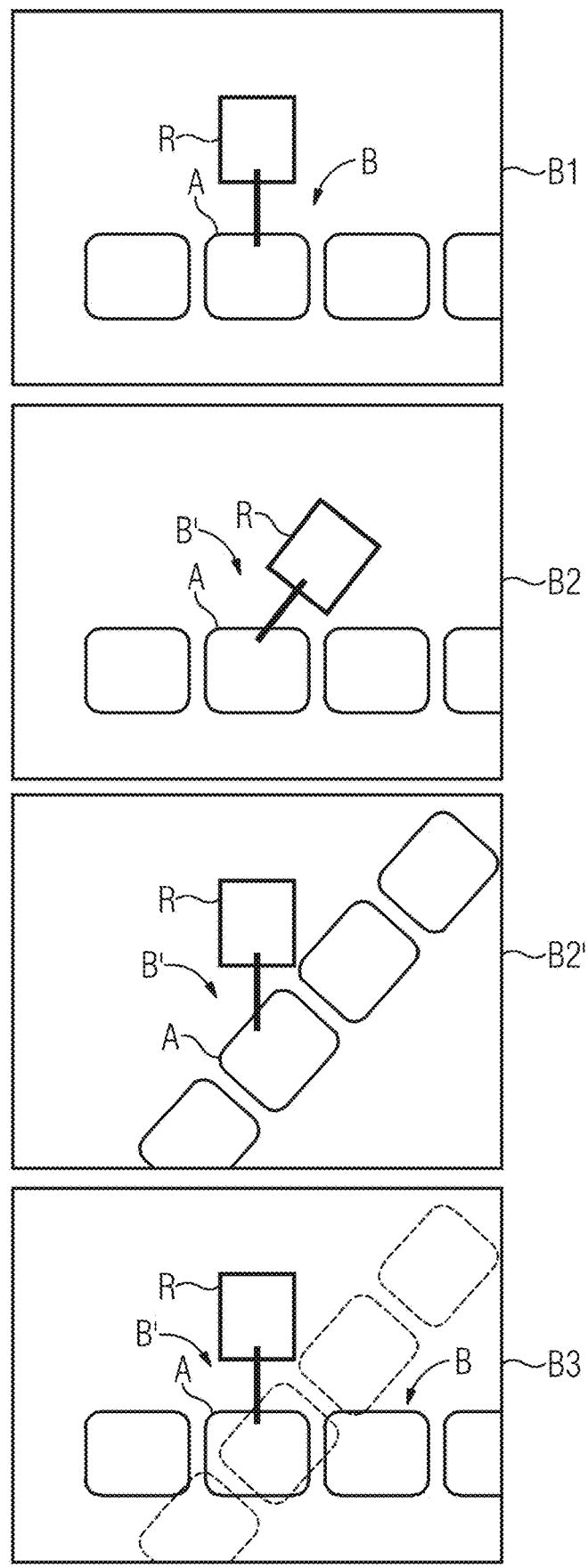
FIG. 4 is a representation of the method for the determination of the validity in a fourth example embodiment.

FIG. 4 shows the method for the determination of the validity in a third example embodiment in a flow diagram.

FIG. 4 shows the case, in particular, opposite to that of FIG. 2, whereby the reference system B according to method step S103 is not valid. By changing the positioning of the reference structure R relative to the anatomical structure A in the second image data set B2, the further reference system B' is defined in this example embodiment.

FIG. 4 further shows the registered second image data set B2' and the third image data set B3. The registered second image data set B2' makes clear that the reference structure R represented in the first image data set B1 and the reference structure R represented in the second image data set B2 are entered as input parameters in the registration, since the registered second image data set B2' is oriented dependent upon the reference structure R. Preferably, therefore, the reference structure R in the first image data set B1 and in the registered second image data set B2 are represented at the same position.

The third image data set B3 shows schematically, in particular, the method step S104. The determination of the third image data set B3 can comprise a fusing and/or superimposition of the first image data set B1 and of the registered second image data set B2. The third image data set B3 shows, in particular, that the reference structure R represented in the first image data set B1 and the reference structure R represented in the registered second image data set B2' lie exactly over one another. The anatomical structure A of the registered second image data set B2' is shown dashed in the third image data set B3.

In the third image data set B3, the further reference system B' and the reference system B are shown, whereby at or after the second time point, the further reference system B' is valid and the reference system B is invalid.

Figure 5:
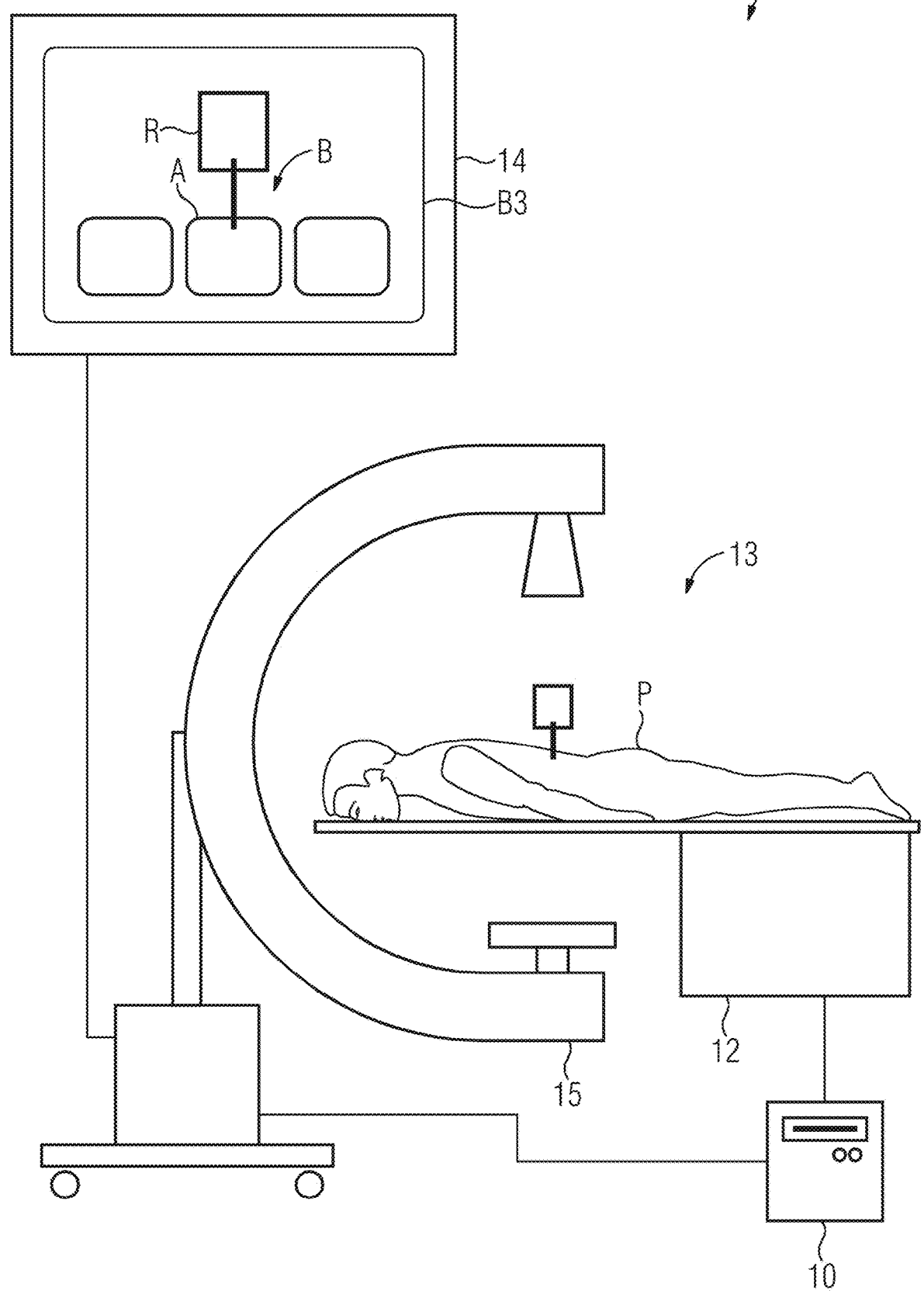
FIG. 5 is a representation of a medical system in a fifth example embodiment.

FIG. 5 shows the medical system 11. The medical system 11 comprises the X-ray apparatus 13 and the computer unit 10. The X-ray apparatus 13 comprises a C-arm system 15, the X-ray detector and the X-ray emitter. In addition to the medical system 11, the patient P is positioned on the patient table 12 in FIG. 5 in a prone position such that, for example, the surgical intervention can be performed on the spinal column of the patient P. Furthermore, the reference structure R is shown in relation to the patient P. Due to the positioning of the reference structure R, a force can act upon the reference structure R, by which the reference system B can become invalid. The force application can take place, for example, via a user, due to gravity and/or through a rotation of the patient P.

In this example embodiment, the medical system 11 comprises the display unit 14. The display unit 14 comprises a monitor and can comprise input device. Shown schematically on the display unit 14 is the display of the third image data set B3 when the reference system B is valid.

Although the invention has been illustrated and described in detail based on the preferred example embodiments, the invention is not restricted by the examples given and other variations can be derived therefrom by a person skilled in the art without departing from the protective scope of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for a determination of a validity of a reference system between a reference structure and an anatomical structure during an operative intervention on a patient, the method comprising:
　acquiring a first image data set of the patient, via an X-ray apparatus, at a first time point during the operative intervention, the first image data set including the reference structure at a first position relative to the patient, the anatomical structure and the reference system between the reference structure and the anatomical structure;
　acquiring a second image data set of the patient at a second time point, via the X-ray apparatus, during the operative intervention, wherein the second image data set includes at least the reference structure at the first position relative to the patient;
　registering the second image data set to the first image data set, wherein the reference structure represented in the first image data set and the reference structure represented in the second image data set are entered as input parameters in the registering and wherein, as a result of the registering of the second image data set to the first image data set, a registered second image data set is determined, and determining the validity of the reference system by a comparison of the registered second image data set with the first image data set.

2. The method of claim 1, wherein the reference structure includes at least one image marker, a first fastening device and a holding structure, and wherein the at least one image marker is releasably connected via the first fastening device to the holding structure.

3. The method of claim 2, wherein the reference structure includes a second fastening device and a holding structure, wherein the holding structure is connected to the patient via the second fastening device and wherein, by way of a connection between the holding structure and the patient, the reference system is initially defined between the reference structure and the anatomical structure.

4. The method of claim 2, wherein the reference structure includes at least one image marker which is X-ray-absorbent and wherein the registering of the second image data set to the first image data set includes a determination of the reference structure via the at least one image marker represented in the first image data set and of the at least one image marker represented in the second image data set.

5. The method of claim 2, wherein the comparison comprises a determination of a third image data set via the first image data set and the second image data set registered.

6. The method of claim 1, wherein the reference structure includes a second fastening device and a holding structure, wherein the holding structure is connected to the patient via the second fastening device and wherein, by way of a connection between the holding structure and the patient, the reference system is initially defined between the reference structure and the anatomical structure.

7. The method of claim 1, wherein the reference structure includes at least one image marker which is X-ray-absorbent and wherein the registering of the second image data set to the first image data set includes a determination of the reference structure via the at least one image marker represented in the first image data set and of the at least one image marker represented in the second image data set.

8. The method of claim 1, wherein the comparison comprises a determination of a third image data set via the first image data set and the second image data set registered.

9. The method of claim 8, wherein the determination of the third image data set includes a weighting of the first image data set and a weighting of the second image data set registered.

10. The method of claim 9, wherein the determination of the validity includes a visualization of the third image data set on a display unit.

11. The method of claim 8, wherein the determination of the validity includes a visualization of the third image data set on a display unit.

12. The method of claim 8, wherein the determination of the validity includes a pixel-related classification of the third image data set into at least two classes dependent upon a deviation from the reference system, whereby pixel-related classification values are determined and wherein the pixel-related classification values are visualized on a display unit as an overlay at least one of to the first image data set, to the registered second image data set and to the third image data set.

13. The method of claim 8, wherein the determination of the validity includes a calling up of a threshold value, a segmenting of the third image data set, a calculation of segment-related values in the segmented third image data set and a comparison of the segment-related values with the threshold value.

14. The method of claim 1, wherein at least one of the acquiring of the first image data set of the patient via the X-ray apparatus takes place at the first time point via the X-ray apparatus during the operative intervention on a spinal column of the patient, and the acquiring of the second image data set of the patient takes place at the second time point via the X-ray apparatus during the operative intervention on a spinal column of the patient and wherein the reference structure is connected to a vertebra of the spinal column before the method for the determination of the validity.

15. The method of claim 1, wherein dependent upon the determination of the validity of the reference system, the anatomical structure represented in the second image data set is registered to the anatomical structure represented in the first image data set or in a fourth image data set, upon the second image data set including the reference structure and the anatomical structure.

16. The method of claim 1, wherein a scan region of a fifth image data set is defined dependent upon the reference structure represented in the second image data set and the anatomical structure, upon the second image data set including the reference structure and the anatomical structure.

17. A non-transitory computer program product, directly loadable into a memory store of a computer unit, including program code segments to carry out the method of claim 1 upon the computer program product being executed in the computer unit.

18. A non-transitory computer readable medium, storing program code segments to carry out the method of claim 1, upon the program code segments being executed in a computer unit.

19. A medical system for a determination of a validity of a reference system between a reference structure and an anatomical structure during an operative intervention on a patient, comprising:

an X-ray apparatus configured to acquire a first image data set of the patient at a first time point during the operative intervention, the first image data set including the reference structure at a first position relative to the patient, the anatomical structure and the reference system between the reference structure and the anatomical structure, and acquire a second image data set of the patient at a second time point during the operative intervention, wherein the second image data set includes at least the reference structure at the first position relative to the patient; and at least one processor, configured to register the second image data set to the first image data set, wherein the reference structure represented in the first image data set and the reference structure represented in the second image data set are entered as input parameters during registering and wherein, as a result of the registering of the second image data set to the first image data set, a registered second image data set is determined, and determine the validity of the reference system by a comparison of the registered second image data set with the first image data set.

20. The medical system of claim 19, wherein the X-ray apparatus includes a C-arm system.

* * * * *